(12) United States Patent
Suzuki

(10) Patent No.: US 10,768,545 B2
(45) Date of Patent: Sep. 8, 2020

(54) CHARGING ROLLER, AND METHOD OF PRODUCING THE SAME

(71) Applicant: SUMITOMO RUBBER INDUSTRIES, LTD., Kobe-shi, Hyogo (JP)

(72) Inventor: Daijiro Suzuki, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 146 days.

(21) Appl. No.: 15/965,043

(22) Filed: Apr. 27, 2018

(65) Prior Publication Data

US 2019/0004447 A1    Jan. 3, 2019

(30) Foreign Application Priority Data

Jun. 30, 2017 (JP) .................. 2017-129428

(51) Int. Cl.

| | |
|---|---|
| *G03G 15/02* | (2006.01) |
| *C08L 71/03* | (2006.01) |
| *C08L 9/00* | (2006.01) |
| *C08L 9/02* | (2006.01) |
| *C08J 7/12* | (2006.01) |
| *C08L 9/06* | (2006.01) |

(52) U.S. Cl.
CPC .......... *G03G 15/0233* (2013.01); *C08J 7/123* (2013.01); *C08L 9/00* (2013.01); *C08L 9/02* (2013.01); *C08L 9/06* (2013.01); *C08L 71/03* (2013.01); *C08J 2309/00* (2013.01); *C08J 2309/02* (2013.01); *C08J 2309/06* (2013.01); *C08J 2311/00* (2013.01); *C08J 2371/03* (2013.01); *C08L 2205/02* (2013.01); *C08L 2205/03* (2013.01); *C08L 2205/035* (2013.01)

(58) Field of Classification Search
CPC .................... G03G 15/0818; G03B 2215/0634
See application file for complete search history.

(56) References Cited

U.S. PATENT DOCUMENTS

| | | | | |
|---|---|---|---|---|
| 9,075,341 | B2* | 7/2015 | Kawatani | G03G 15/0818 |
| 10,095,157 | B2* | 10/2018 | Suzuki | G03G 15/0818 |
| 10,539,900 | B2* | 1/2020 | Horiuchi | C08L 9/00 |
| 2011/0281703 | A1 | 11/2011 | Tajima et al. | |
| 2013/0288869 | A1 | 10/2013 | Tajima | |

(Continued)

FOREIGN PATENT DOCUMENTS

| | | |
|---|---|---|
| JP | 2011-257723 A | 12/2011 |
| JP | 2013-231846 A | 12/2011 |

*Primary Examiner* — Jason L Vaughan
(74) *Attorney, Agent, or Firm* — Birch, Stewart, Kolasch & Birch, LLP

(57) ABSTRACT

An inventive charging roller (1) includes a roller body (2) which is formed of a crosslinked product of a rubber composition containing a rubber component including 30 to 70 parts by mass of GECO, 15 to 60 parts by mass of IR and not less than 1 part by mass of SBR and/or NBR based on 100 parts by mass of the overall rubber component and has an outer peripheral surface (5) finished in a finish-polished surface. An inventive production method includes the steps of: forming a roller body (2) from the crosslinked product of the rubber composition described above; and wet-polishing or mirror-polishing an outer peripheral surface (5) of the roller body (2) into a finish-polished surface.

7 Claims, 1 Drawing Sheet

(56) References Cited

U.S. PATENT DOCUMENTS

2014/0023410 A1* 1/2014 Kawatani ........... G03G 15/0818
399/286
2018/0011416 A1* 1/2018 Horiuchi .................. C08L 9/02

* cited by examiner

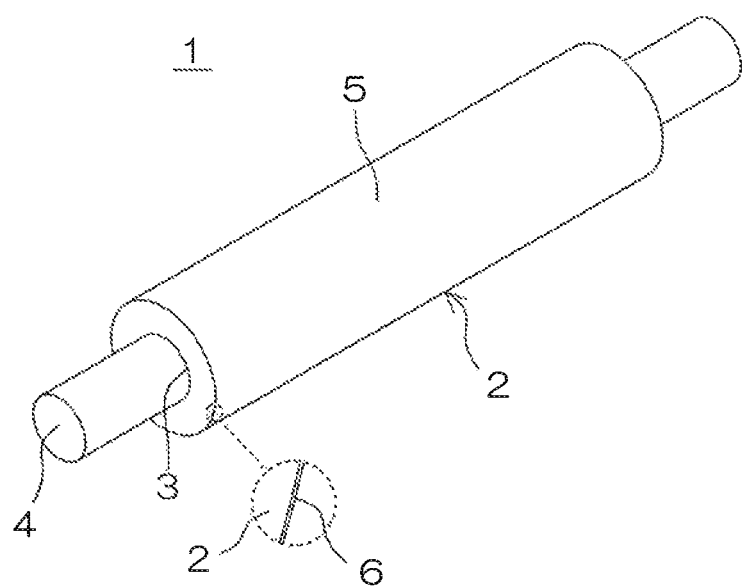

CHARGING ROLLER, AND METHOD OF PRODUCING THE SAME

TECHNICAL FIELD

The present invention relates to a charging roller to be used in an electrophotographic image forming apparatus, and to a method of producing the same.

BACKGROUND ART

In an electrophotographic image forming apparatus such as a laser printer, an electrostatic copying machine, a plain paper facsimile machine or a printer-copier-facsimile multifunction machine, a charging roller is used for uniformly electrically charging a surface of a photoreceptor body.

The charging roller typically includes a roller body having a single layer structure or a multilayer structure including a layer produced, for example, by preparing a semiconductive rubber composition containing an ion conductive rubber (e.g., epichlorohydrin rubber) as a rubber component, forming the semiconductive rubber composition into a tubular body and then crosslinking the rubber component of the tubular body.

Incidentally, fine particles such as external additive particles externally added to toner or finely broken toner particles occurring when image formation is repeatedly performed are liable to adhere to an outer peripheral surface of the roller body to be transferred from the outer peripheral surface to a formed image, resulting in defective image formation. For suppression of the adhesion of the fine particles, it is a general practice to condition the outer peripheral surface, for example, by wet-polishing the outer peripheral surface and/or coating the outer peripheral surface with a coating film.

However, the coating film is formed by applying a liquid coating agent onto the outer peripheral surface of the roller body by a spraying method, a dipping method or other coating method, and then drying the applied liquid coating agent. Therefore, the coating film is liable to suffer from contamination with foreign matter such as dust, uneven thickness and other defects during the forming process.

For preparation of the coating agent, an organic solvent is required. The use of the organic solvent may exert a great load on the environment, and go against a recent trend toward reduction of VOC (volatile organic compounds).

It is also contemplated to form an oxide film instead of the coating film by finishing the outer peripheral surface of the roller body formed from the rubber composition by a wet polishing method or the like, and oxidizing the rubber composition present in the outer peripheral surface (finish-polished surface) by irradiating the outer peripheral surface with ultraviolet radiation in an oxidizing atmosphere, and to prepare a rubber composition suitable for the formation of the oxide film (see Patent Documents 1 and 2).

A known example of the rubber composition suitable for the formation of the oxide film is a rubber composition containing the aforementioned ion conductive rubber as well as diene rubber which is oxidizable to form the oxide film by the irradiation with the ultraviolet radiation.

CITATION LIST

Patent Document

[PATENT DOCUMENT 1] JP2011-257723A
[PATENT DOCUMENT 2] JP2013-231846A

SUMMARY OF THE INVENTION

Problem to be Solved by the Invention

According to studies conducted by the inventor of the present invention, however, the aforementioned conventional charging roller still fails to sufficiently suppress the adhesion of the fine particles. Further, the charging roller often fails to uniformly electrically charge the surface of the photoreceptor body depending on its surface geometry, resulting in formation of uneven-density images.

It is an object of the present invention to provide a charging roller which has a simplified construction without the provision of the coating film and yet is capable of uniformly electrically charging the surface of the photoreceptor body and suppressing the adhesion of the fine particles, and to provide a method of producing the charging roller.

Solution to Problem

According to an inventive aspect, there is provided a charging roller including a roller body having an outer peripheral surface finished in a finish-polished surface, wherein the roller body has a surface portion including the finish-polished surface, and at least the surface portion comprises a crosslinked product of a rubber composition containing a rubber component, wherein the rubber component includes, based on 100 parts by mass of the overall rubber component:

(1) not less than 30 parts by mass and not greater than 70 parts by mass of epichlorohydrin-ethylene oxide-allyl glycidyl ether terpolymer rubber (GECO);
(2) not less than 15 parts by mass and not greater than 60 parts by mass of isoprene rubber (IR); and
(3) not less than 1 part by mass of at least one selected from the group consisting of styrene butadiene rubber (SBR) and acrylonitrile butadiene rubber (NBR).

According to another inventive aspect, there is provided a method of producing a charging roller including a roller body, the method including the steps of:

forming at least a surface portion of the roller body from a crosslinked product of a rubber composition containing a rubber component; and wet-polishing an outer peripheral surface of the roller body into a finish-polished surface;

wherein the rubber component includes, based on 100 parts by mass of the overall rubber component:

(1) not less than 30 parts by mass and not greater than 70 parts by mass of GECO;
(2) not less than 15 parts by mass and not greater than 60 parts by mass of IR; and
(3) not less than 1 part by mass of at least one selected from the group consisting of SBR and NBR.

Effects of the Invention

According to the present invention, the charging roller has a simplified construction without the provision of the coating film and yet is capable of uniformly electrically charging the surface of the photoreceptor body and more advantageously suppressing the adhesion of the fine particles. The method of producing the charging roller is also provided.

BRIEF DESCRIPTION OF THE DRAWING

FIGURE is a perspective view showing an exemplary charging roller according to an embodiment of the present invention.

EMBODIMENTS OF THE INVENTION

The outer peripheral surface of the roller body formed from the rubber composition generally has minute asperities even after being finished, for example, by the wet polishing method. According to the studies conducted by the inventor of the present invention, the fine particles are liable to selectively adhere to projections of the asperities.

Particularly, minute asperities having a shorter periodicity are liable to be present on the outer peripheral surface of the roller body formed of the crosslinked product of the conventional rubber composition and finished by the wet polishing method. Therefore, the fine particles are liable to adhere to closely adjacent projections of the short-periodicity asperities. As a result, the roller body formed of the crosslinked product of the conventional rubber composition is liable to suffer from thorough adhesion of the fine particles over the generally entire outer peripheral surface thereof. Therefore, the amount of the fine particles adhering to the outer peripheral surface tends to be substantially increased.

Where the rubber component of the rubber composition includes GECO selected as the epichlorohydrin rubber and IR selected as the diene rubber in the aforementioned predetermined proportions, the IR improves the polishability of the crosslinked rubber composition to increase the periodicity of the asperities present on the outer peripheral surface after the polishing, as compared with other diene rubbers such as the NBR.

However, the GECO and the IR are less compatible with each other. Therefore, if only these two rubbers are used in combination for the rubber component, the outer peripheral surface has a higher surface roughness even after being finished by the wet polishing method. Therefore, the surface of the photoreceptor body cannot be uniformly electrically charged, resulting in the formation of uneven-density images.

Where the GECO, the IR and at least one of the SBR and the NBR are blended in the aforementioned predetermined proportions, in contrast, the SBR and/or the NBR function as a compatibilizer for compatibilization between the GECO and the IR. Thus, the outer peripheral surface finished by the wet polishing method (finish-polished surface) is substantially free from the increase in surface roughness.

Therefore, the finish-polished surface has a smaller surface roughness, making it possible to uniformly electrically charge the surface of the photoreceptor body. Further, the periodicity of the asperities present on the finish-polished surface can be increased by the aforementioned function of the IR as compared with the conventional case. As a result, inter-projection distances can be increased to reduce the occupancy rate of the projections on the finish-polished surface, thereby reducing the amount of the fine particles adhering to the projections.

According to the present invention, therefore, where the formulation of the rubber composition is controlled as described above, the charging roller which has a simplified construction without the provision of the coating film and yet is capable of uniformly electrically charging the surface of the photoreceptor body and more advantageously suppressing the adhesion of the fine particles can be produced from the rubber composition simply by performing the forming step, the crosslinking step and the finish-polishing step.

<<Rubber Composition>>

<Rubber Component>

(GECO)

Usable as the GECO are various terpolymers each having a structure obtained by copolymerizing three monomers, i.e., epichlorohydrin, ethylene oxide and allyl glycidyl ether.

The GECO has an ethylene oxide content of not less than 30 mol % and not greater than 80 mol %, particularly preferably not less than 50 mol %.

Ethylene oxide functions to reduce the roller resistance of the charging roller. If the ethylene oxide content is less than the aforementioned range, however, it will be impossible to sufficiently provide this function and hence to sufficiently reduce the roller resistance.

If the ethylene oxide content is greater than the aforementioned range, on the other hand, ethylene oxide is liable to be crystallized, whereby the segment motion of molecular chains is hindered to adversely increase the roller resistance of the charging roller. Further, the rubber composition is liable to have an excessively high hardness after the crosslinking and have a higher viscosity and, hence, poorer processability when being heat-melted before the crosslinking.

The GECO preferably has an allyl glycidyl ether content of not less than 0.5 mol % and not greater than 10 mol %, particularly preferably not less than 2 mol % and not greater than 5 mol %.

Allyl glycidyl ether per se functions as side chains of the copolymer to provide a free volume, whereby the crystallization of ethylene oxide is suppressed to reduce the roller resistance of the charging roller. However, if the allyl glycidyl ether content is less than the aforementioned range, it will be impossible to provide this function and hence to sufficiently reduce the roller resistance.

Allyl glycidyl ether also functions as crosslinking sites during the crosslinking of the GECO. Therefore, if the allyl glycidyl ether content is greater than the aforementioned range, the crosslinking density of the GECO is liable to be excessively increased, whereby the segment motion of molecular chains is hindered to adversely increase the roller resistance.

The GECO has an epichlorohydrin content that is a balance obtained by subtracting the ethylene oxide content and the allyl glycidyl ether content from the total. That is, the epichlorohydrin content is preferably not less than mol % and not greater than 69.5 mol %, particularly preferably not less than 19.5 mol % and not greater than 60 mol %.

Examples of the GECO include copolymers of the three monomers described above in a narrow sense, as well as known modification products obtained by modifying an epichlorohydrin-ethylene oxide bipolymer (ECO) with allyl glycidyl ether. In the present invention, any of these GECOs may be used.

These GECOs may be used alone or in combination.

(IR)

Where the IR and the GECO are used in combination, as described above, the IR functions to improve the polishability of the crosslinked rubber composition to increase the periodicity of the asperities present on the finish-polished surface.

Further, the IR functions to impart the charging roller with proper rubber characteristic properties, i.e., to make the charging roller flexible and less susceptible to permanent compressive deformation with a reduced compression set. In addition, the IR serves as a material for an oxide film to be formed in the outer peripheral surface of the charging roller through oxidation by irradiation with ultraviolet radiation in an oxidizing atmosphere as will be described later.

Usable as the IR are various crosslinkable polymers each having a polyisoprene structure.

These IRs may be used alone or in combination.

(SBR)

The SBR serves as a compatibilizer for compatibilization between the GECO and the IR to suppress the increase in the surface roughness of the finish-polished surface as described above.

The SBR also functions to impart the charging roller with the proper rubber characteristic properties described above. In addition, the SBR serves as a material for the oxide film to be formed in the outer peripheral surface of the charging roller through the oxidation by the irradiation with the ultraviolet radiation in the oxidizing atmosphere.

Usable as the SBR are various crosslinkable SBRs synthesized by copolymerizing styrene and butadiene by an emulsion polymerization method, a solution polymerization method and other various polymerization methods.

According to the styrene content, the SBRs are classified into a higher styrene content type, an intermediate styrene content type and a lower styrene content type, and any of these types of SBRs may be used.

The SBRs include those of an oil-extension type having flexibility controlled by addition of an extension oil, and those of a non-oil-extension type containing no extension oil. In the present invention, a non-oil-extension type SBR which does not contain the extension oil (which may be a bleed substance) is preferably used for prevention of the contamination of the photoreceptor body.

These SBRs may be used alone or in combination.

(NBR)

Like the SBR, the NBR serves as a compatibilizer for compatibilization between the GECO and the IR to suppress the increase in the surface roughness of the finish-polished surface as described above.

The NBR also functions to impart the charging roller with the proper rubber characteristic properties. In addition, the NBR serves as a material for the oxide film to be formed in the outer peripheral surface of the charging roller through the oxidation by the irradiation with the ultraviolet radiation in the oxidizing atmosphere.

Usable as the NBR are various crosslinkable NBRs synthesized by copolymerizing acrylonitrile and butadiene by an emulsion polymerization method and other various polymerization methods.

A lower acrylonitrile content type NBR having an acrylonitrile content of not greater than 24%, an intermediate acrylonitrile content type NBR having an acrylonitrile content of 25 to 30%, an intermediate to higher acrylonitrile content type NBR having an acrylonitrile content of 31 to 35%, a higher acrylonitrile content type NBR having an acrylonitrile content of 36 to 42% and a very high acrylonitrile content type NBR having an acrylonitrile content of not less than 43% are usable as the NBR.

The NBRs include those of an oil-extension type having flexibility controlled by addition of an extension oil, and those of a non-oil-extension type containing no extension oil. In the present invention, a non-oil-extension type NBR which does not contain the extension oil (which may be a bleed substance) is preferably used for the prevention of the contamination of the photoreceptor body.

These NBRs may be used alone or in combination.

<Other Rubbers for Rubber Component>

The rubber component may further contain at least one selected from the group consisting of butadiene rubber (BR) and chloroprene rubber (CR).

The BR also functions to impart the charging roller with the proper rubber characteristic properties. In addition, the BR serves as a material for the oxide film to be formed in the outer peripheral surface of the charging roller through the oxidation by the irradiation with the ultraviolet radiation in the oxidizing atmosphere.

Usable as the BR are various crosslinkable BRs each having a polybutadiene structure in a molecule thereof.

Particularly, a higher cis-content BR having a cis-1,4 bond content of 95% or higher and proper rubber characteristic properties in a wider temperature range from a lower temperature to a higher temperature is preferred.

The BRs include those of an oil-extension type having flexibility controlled by addition of an extension oil, and those of a non-oil-extension type containing no extension oil. In the present invention, a non-oil-extension type BR which does not contain the extension oil (which may be a bleed substance) is preferably used for the prevention of the contamination of the photoreceptor body.

These BRs may be used alone or in combination.

The CR has the rubber functions described above. In addition, the CR, which is a polar rubber, functions to finely control the roller resistance of the charging roller.

Usable as the CR are various crosslinkable CRs synthesized by emulsion polymerization of chloroprene.

The CRs are classified in a sulfur modification type and a non-sulfur-modification type depending on the type of a molecular weight adjusting agent to be used for the emulsion polymerization of chloroprene.

The sulfur modification type CR is synthesized by plasticizing a copolymer of chloroprene and sulfur (molecular weight adjusting agent) with thiuram disulfide or the like to adjust the viscosity of the copolymer to a predetermined viscosity level.

The non-sulfur-modification type CR is classified, for example, in a mercaptan modification type, a xanthogen modification type or the like.

The mercaptan modification type CR is synthesized in substantially the same manner as the sulfur modification type CR, except that an alkyl mercaptan such as n-dodecyl mercaptan, tert-dodecyl mercaptan or octyl mercaptan, for example, is used as the molecular weight adjusting agent.

The xanthogen modification type CR is also synthesized in substantially the same manner as the sulfur modification type CR, except that an alkyl xanthogen compound is used as the molecular weight adjusting agent.

Further, the CR is classified in a lower crystallization speed type, an intermediate crystallization speed type or a higher crystallization speed type depending on the crystallization speed.

In the present invention, any of the aforementioned types of CRs may be used. Particularly, a CR of the non-sulfur-modification type and the lower crystallization speed type is preferred.

Further, a copolymer of chloroprene and other comonomer may be used as the CR. Examples of the other comonomer include 2,3-dichloro-1,3-butadiene, 1-chloro-1,3-butadiene, styrene, acrylonitrile, methacrylonitrile, isoprene, butadiene, acrylic acid, acrylates, methacrylic acid and methacrylates, which may be used alone or in combination.

Further, the CRs include those of an oil-extension type having flexibility controlled by addition of an extension oil, and those of a non-oil-extension type containing no extension oil. In the present invention, a non-oil-extension type CR which does not contain the extension oil (which may be a bleed substance) is preferably used for the prevention of the contamination of the photoreceptor body.

These CRs may be used alone or in combination.

(Proportions of Rubbers for Rubber Component)

The proportion of the GECO to be blended is limited to not less than 30 parts by mass and not greater than 70 parts by mass based on 100 parts by mass of the overall rubber component.

If the proportion of the GECO is less than the aforementioned range, it will be impossible to sufficiently reduce the roller resistance of the charging roller to a proper range. Therefore, the charging roller will fail to uniformly electrically charge the surface of the photoreceptor body, resulting in formation of uneven-density images.

If the proportion of the GECO is greater than the aforementioned range, on the other hand, the compatibility with the IR will be reduced even with the use of the SBR and/or the NBR to thereby increase the surface roughness of the finish-polished surface. Therefore, the charging roller will fail to uniformly electrically charge the surface of the photoreceptor body, resulting in the formation of uneven-density images.

Where the proportion of the GECO falls within the aforementioned range, in contrast, it is possible to reduce the surface roughness of the finish-polished surface to sufficiently reduce the roller resistance of the charging roller to the proper range. Thus, the charging roller can uniformly electrically charge the surface of the photoreceptor body, thereby suppressing the formation of uneven-density images.

For further improvement of these effects, the proportion of the GECO is preferably not less than 35 parts by mass and not greater than 50 parts by mass, particularly preferably not greater than 40 parts by mass, based on 100 parts by mass of the overall rubber component within the aforementioned range.

The proportion of the IR to be blended is limited to not less than 15 parts by mass and not greater than 60 parts by mass based on 100 parts by mass of the overall rubber component.

If the proportion of the IR is less than the aforementioned range, it will be impossible to sufficiently provide the effect of the combinational use of the IR and the GECO for improving the polishability of the crosslinked rubber composition to increase the periodicity of the asperities present on the finish-polished surface. This will reduce the periodicity of the asperities present on the finish-polished surface to thereby increase the amount of fine particles adhering to the surface. Even with the use of the SBR and/or the NBR, the compatibility with the GECO will be reduced to thereby increase the surface roughness of the finish-polished surface. Therefore, the charging roller will fail to uniformly electrically charge the surface of the photoreceptor body, resulting in the formation of uneven-density images.

If the proportion of the IR is greater than the aforementioned range, the rubber composition is liable to become excessively soft. Therefore, it will be impossible to form the rubber composition into a predetermined roller body shape or to impart the crosslinked rubber composition with a hardness suitable for the roller body.

Where the proportion of the IR falls within the aforementioned range, in contrast, it is possible to impart the uncrosslinked or crosslinked rubber composition with a proper hardness, and to increase the periodicity of the asperities present on the finish-polished surface to advantageously suppress the adhesion of the fine particles. Further, it is possible to reduce the surface roughness of the finish-polished surface. Thus, the charging roller can uniformly electrically charge the surface of the photoreceptor body, thereby suppressing the formation of uneven-density images.

For further improvement of these effects, the proportion of the IR is preferably not less than 20 parts by mass and not greater than 55 parts by mass based on 100 parts by mass of the overall rubber component within the aforementioned range.

The proportion of the SBR and/or the NBR to be blended is limited to not less than 1 part by mass based on 100 parts by mass of the overall rubber component.

If the proportion of the SBR and/or the NBR is less than the aforementioned range, it will be impossible to sufficiently provide the function of the SBR and/or the NBR as the compatibilizer. Therefore, the compatibility between the GECO and the IR is liable to be reduced to increase the surface roughness of the finish-polished surface. Accordingly, the charging roller will fail to uniformly electrically charge the surface of the photoreceptor body, resulting in the formation of uneven-density images.

Where the proportion of the SBR and/or the NBR falls within the aforementioned range, in contrast, it is possible to improve the compatibility between the GECO and the IR, thereby reducing the surface roughness of the finish-polished surface. Therefore, the charging roller can uniformly electrically charge the surface of the photoreceptor body, thereby suppressing the formation of uneven-density images.

The upper limit of the proportion of the SBR and/or the NBR is not particularly limited, but is preferably not greater than 45 parts by mass based on 100 parts by mass of the overall rubber component.

If the proportion of the SBR and/or the NBR is greater than the aforementioned range, the proportion of the IR is relatively reduced. This will reduce the polishability of the crosslinked rubber composition and, hence, the periodicity of the asperities present on the finish-polished surface, thereby increasing the amount of the fine particles adhering to the finish-polished surface. Further, the proportion of the GECO is relatively reduced. This will make it impossible to sufficiently reduce the roller resistance of the charging roller to the proper range. Therefore, the charging roller will fail to uniformly electrically charge the surface of the photoreceptor body, resulting in the formation of uneven-density images.

Where the proportion of the SBR and/or the NBR falls within the aforementioned range, in contrast, it is possible to increase the periodicity of the asperities present on the finish-polished surface and, hence, to advantageously suppress the adhesion of the fine particles. Further, it is possible to reduce the surface roughness of the finish-polished surface. Therefore, the charging roller can uniformly electrically charge the surface of the photoreceptor body, thereby suppressing the formation of uneven-density images.

Where the SBR and the NBR are used in combination, the total proportion of the SBR and the NBR may be set within the aforementioned range.

The proportion of the BR and the CR to be additionally used for the rubber component is a balance obtained by subtracting the proportions of the GECO, the IR and the SBR and/or the NBR from the total. More specifically, the proportion of the BR and/or the CR may be determined so that the total proportion of these rubbers is 100 parts by mass when the proportions of the GECO, the IR and the SBR and/or the NBR are respectively set within the aforementioned predetermined ranges.

Where the total proportion of the GECO, the IR and the SBR and/or the NBR is 100 parts by mass, there is no need to blend the BR and/or the CR.

<Crosslinking Component>

The rubber composition contains a crosslinking component for crosslinking the rubber component. A thiourea crosslinking agent and a sulfur crosslinking agent are preferably used in combination as the crosslinking component.

(Thiourea Crosslinking Agent)

Usable as the thiourea cross linking agent are various thiourea compounds each having a thiourea structure in a molecule thereof and functioning as a crosslinking agent for mainly crosslinking the GECO.

Examples of the thiourea crosslinking agent include ethylene thiourea, N,N-diphenylthiourea, trimethylthiourea, thioureas represented by the following formula (1):

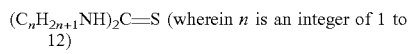
(wherein $n$ is an integer of 1 to 12)

and tetramethylthiourea, which may be used alone or in combination. Particularly, ethylene thiourea is preferred.

The proportion of the thiourea crosslinking agent to be blended is preferably not less than 0.1 part by mass and not greater than 1 part by mass based on 100 parts by mass of the overall rubber component in order to impart the roller body with the proper rubber characteristic properties described above.

(Crosslinking Accelerating Agent)

Any of various crosslinking accelerating agents capable of accelerating the crosslinking reaction of the GECO with the thiourea crosslinking agent may be used in combination with the thiourea crosslinking agent.

Examples of the crosslinking accelerating agents include guanidine accelerating agents such as 1,3-diphenylguanidine, 1,3-di-o-tolylguanidine and 1-o-tolylbiguanide, which may be used alone or in combination. Particularly, 1,3-di-o-tolylguanidine is preferred.

The proportion of the crosslinking accelerating agent to be blended is preferably not less than 0.1 part by mass and not greater than 1 part by mass based on 100 parts by mass of the overall rubber component in order to sufficiently provide the crosslinking reaction accelerating effect.

(Sulfur Crosslinking Agent)

Examples of the sulfur crosslinking agent for mainly crosslinking the diene rubber and the GECO include sulfur such as sulfur powder, oil-treated sulfur powder, precipitated sulfur, colloidal sulfur and dispersive sulfur, and organic sulfur-containing compounds such as tetramethylthiuram disulfide and N,N-dithiobismorpholine. Particularly, the sulfur is preferred.

The proportion of the sulfur to be blended is preferably not less than 0.5 parts by mass and not greater than 2 parts by mass based on 100 parts by mass of the overall rubber component in order to impart the roller body with the proper rubber characteristic properties described above.

Where the oil-treated sulfur powder or the dispersive sulfur is used as the sulfur, for example, the proportion of the sulfur is the effective proportion of sulfur contained in the oil-treated sulfur powder or the dispersive sulfur.

Where an organic sulfur-containing compound is used as the crosslinking agent, the proportion of the organic sulfur-containing compound is preferably adjusted so that the proportion of sulfur contained in the molecule of the organic sulfur-containing compound falls within the aforementioned range based on 100 parts by mass of the overall rubber component.

(Crosslinking Accelerating Agent)

Any of various crosslinking accelerating agents capable of accelerating the crosslinking reaction of the diene rubber and the like with the sulfur crosslinking agent may be used in combination with the sulfur crosslinking agent.

Examples of the crosslinking accelerating agent include a thiazole accelerating agent, a thiuram accelerating agent, a sulfenamide accelerating agent and a dithiocarbamate accelerating agent, which may be used alone or in combination. Particularly, the thiazole accelerating agent and the thiuram accelerating agent are preferably used in combination.

Examples of the thiazole accelerating agent include 2-mercaptobenzothiazole, di-2-benzothiazolyl disulfide, a zinc salt of 2-mercaptobenzothiazole, a cyclohexylamine salt of 2-mercaptobenzothiazole, 2-(N,N-diethylthiocarbamoylthio)benzothiazole and 2-(4'-morpholinodithio)benzothiazole, which may be used alone or in combination. Particularly, di-2-benzothiazolyl disulfide is preferred.

Examples of the thiuram accelerating agent include tetramethylthiuram monosulfide, tetramethylthiuram disulfide, tetraethylthiuram disulfide, tetrabutylthiuram disulfide, tetrakis(2-ethylhexyl)thiuram disulfide and dipentamethylenethiuram tetrasulfide, which may be used alone or in combination. Particularly, tetramethylthiuram monosulfide is preferred.

Where the aforementioned two types of crosslinking accelerating agents are used in combination, the proportion of the thiazole accelerating agent to be blended is preferably not less than 0.3 parts by mass and not greater than 2 parts by mass based on 100 parts by mass of the overall rubber component in order to sufficiently provide the crosslinking reaction accelerating effect. Further, the proportion of the thiuram accelerating agent to be blended is preferably not less than 0.1 part by mass and not greater than 1 part by mass based on 100 parts by mass of the overall rubber component.

<Electrically Conductive Agent>

A salt (ionic salt) containing a cation and an anion having a fluoro group and a sulfonyl group in its molecule may be further blended as an electrically conductive agent in the rubber composition.

The blending of the ionic salt as the electrically conductive agent further improves the ion conductivity of the rubber composition to further reduce the roller resistance of the charging roller.

Examples of the anion having the fluoro group and the sulfonyl group in the molecule of the ionic salt include fluoroalkylsulfonate ions, bis(fluoroalkylsulfonyl)imide ions and tris(fluoroalkylsulfonyl)methide ions, which may be used alone or in combination.

Examples of the fluoroalkylsulfonate ions include $CF_3SO_3^-$ and $C_4F_9SO_3^-$, which may be used alone or in combination.

Examples of the bis(fluoroalkylsulfonyl)imide ions include $(CF_3SO_2)_2N^-$, $(C_2F_5SO_2)_2N^-$, $(C_4F_9SO_2)(CF_3SO_2)N^-$, $(FSO_2C_6F_4)(CF_3SO_2)N^-$, $(C_8F_{17}SO_2)(CF_3SO_2)N^-$, $(CF_3CH_2OSO_2)_2N^-$, $(CF_3CF_2CH_2OSO_2)_2N^-$, $(HCF_2CF_2CH_2OSO_2)_2N^-$, and $[(CF_3)_2CHOSO_2]_2N^-$, which may be used alone or in combination.

Examples of the tris(fluoroalkylsulfonyl)methide ions include $(CF_3SO_2)_3C^-$ and $(CF_3CH_2OSO_2)_3C^-$, which may be used alone or in combination.

Examples of the cation include ions of alkali metals such as sodium, lithium and potassium, ions of Group II elements such as beryllium, magnesium, calcium, strontium and barium, ions of transition elements, cations of amphoteric elements, a quaternary ammonium ion and an imidazolium cation, which may be used alone or in combination.

Particularly, lithium salts containing the lithium ion as the cation and potassium salts containing the potassium ion as the cation are preferred as the ionic salt.

Particularly, $(CF_3SO_2)_2NLi$ (lithium bis(trifluoromethanesulfonyl)imide, Li-TFSI) and/or $(CF_3SO_2)_2NK$ (potassium bis(trifluoromethanesulfonyl)imide, K-TFSI) are preferred to improve the ion conductivity of the rubber composition to reduce the roller resistance of the charging roller.

The proportion of the ionic salt to be blended is preferably not less than 0.5 parts by mass and not greater than 7 parts by mass based on 100 parts by mass of the overall rubber component.

<Other Ingredients>

As required, various additives may be blended in the rubber composition. Examples of the additives include a crosslinking acceleration assisting agent, an acid accepting agent, a filler, a plasticizing agent, a processing aid and a degradation preventing agent.

Examples of the crosslinking acceleration assisting agent include metal compounds such as zinc oxide (zinc white), fatty acids such as stearic acid, oleic acid and cotton seed fatty acids, and other conventionally known crosslinking acceleration assisting agents, which may be used alone or in combination.

The proportions of these crosslinking acceleration assisting agents to be blended are each preferably not less than 0.1 part by mass and not greater than 7 parts by mass based on 100 parts by mass of the overall rubber component.

In the presence of the acid accepting agent, chlorine-containing gases generated from the GECO and the CR during the crosslinking of the rubber component are prevented from remaining in the roller body. Thus, the acid accepting agent functions to prevent the inhibition of the crosslinking and the contamination of the photoreceptor body, which may otherwise be caused by the chlorine-containing gases.

Any of various substances serving as acid acceptors may be used as the acid accepting agent. Preferred examples of the acid accepting agent include hydrotalcites and Magsarat which are excellent in dispersibility. Particularly, the hydrotalcites are preferred.

Where the hydrotalcites are used in combination with magnesium oxide or potassium oxide, a higher acid accepting effect can be provided, thereby more reliably preventing the contamination of the photoreceptor body.

The proportion of the acid accepting agent to be blended is preferably not less than 0.1 part by mass and not greater than 7 parts by mass based on 100 parts by mass of the overall rubber component.

Examples of the filler include zinc oxide, silica, carbon black, clay, talc, calcium carbonate, magnesium carbonate and aluminum hydroxide, which may be used alone or in combination.

The blending of the filler improves the mechanical strength and the like of the charging roller.

Where electrically conductive carbon black is used as the filler, it is possible to impart the roller body with electron conductivity.

An example of the electrically conductive carbon black is acetylene black.

The proportion of the electrically conductive carbon black to be blended is preferably not less than 1 part by mass and not greater than 10 parts by mass based on 100 parts by mass of the overall rubber component.

Examples of the plasticizing agent include plasticizers such as dibutyl phthalate, dioctyl phthalate and tricresyl phosphate, and waxes such as polar waxes. Examples of the processing aid include metal salts of fatty acids such as zinc stearate.

The proportion of the plasticizing agent and/or the processing aid to be blended is preferably not greater than 3 parts by mass based on 100 parts by mass of the overall rubber component.

Examples of the degradation preventing agent include various antiaging agents and antioxidants.

The antiaging agents serve to reduce the environmental dependence of the roller resistance of the charging roller and to suppress the increase in roller resistance during continuous energization of the charging roller. Examples of the antiaging agents include nickel diethyldithiocarbamate and nickel dibutyldithiocarbamate.

The proportion of the antiaging agent to be blended is preferably not less than 0.1 part by mass and not greater than 1 part by mass based on 100 parts by mass of the overall rubber component.

Other examples of the additives include an anti-scorching agent, a lubricant, a pigment, an antistatic agent, a flame retarder, a neutralizing agent, a nucleating agent and a co-crosslinking agent, which may be each blended in a proper proportion.

<<Charging Roller>>

FIGURE is a perspective view illustrating an exemplary charging roller according to one embodiment of the present invention.

Referring to FIGURE, the charging roller 1 according to this embodiment includes a tubular roller body 2 of a nonporous single-layer structure formed from the rubber composition containing the aforementioned ingredients. A shaft 4 is inserted through and fixed to a center through-hole 3 of the roller body 2.

The shaft 4 is a unitary member made of a metal such as aluminum, an aluminum alloy or a stainless steel.

The shaft 4 is electrically connected to and mechanically fixed to the roller body 2, for example, via an electrically conductive adhesive agent. Alternatively, a shaft having an outer diameter that is greater than the inner diameter of the through-hole 3 is used as the shaft 4, and press-inserted into the through-hole 3 to be electrically connected to and mechanically fixed to the roller body 2. These arrangements may be used in combination for the electrical connection and the mechanical fixing of the shaft 4 to the roller body 2.

The roller body 2 has an outer peripheral surface 5 wet-polished or mirror-polished into a finish-polished surface. In this embodiment, the roller body 2 has an oxide film 6 provided in the outer peripheral surface 5 thereof as shown in FIGURE on an enlarged scale.

If the roller body 2 is formed of the crosslinked product of the specific rubber composition containing the aforementioned ingredients but the outer peripheral surface 5 of the roller body 2 is neither wet-polished nor mirror-polished into the finish-polished surface, the outer peripheral surface 5 will have a greater surface roughness. Therefore, fine particles are liable to not only stick to projections of the asperities of the outer peripheral surface but also intrude into recesses of the asperities of the outer peripheral surface. As a result, the amount of the fine particles adhering to the outer peripheral surface is increased. Therefore, the charging roller will fail to uniformly electrically charge the surface of the photoreceptor body, resulting in the formation of uneven-density images.

Where the roller body 2 is formed of the crosslinked product of the specific rubber composition containing the aforementioned ingredients and the outer peripheral surface 5 of the roller body 2 is wet-polished or mirror-polished into the finish-polished surface, in contrast, the asperities present on the outer peripheral surface 5 after the polishing have a longer periodicity. Therefore, as described above, the charging roller 1 has a simplified construction without the provision of the coating film and yet is capable of uniformly electrically charging the surface of the photoreceptor body and more advantageously suppressing the adhesion of the fine particles.

The surface geometry of the finish-polished surface is not particularly limited, but is preferably such that an arithmetical mean height Sa specified by International Organization for Standardization ISO 25178-2:2012 "Geometrical product specifications (GPS)—Surface texture: Areal-Part 2: Terms, definitions and surface texture parameters" is not less than 1 µm and not greater than 4 µm.

Further, the oxide film 6 provided in the outer peripheral surface (finish-polished surface) 5 functions as a dielectric layer to reduce the dielectric dissipation factor of the charging roller 1. The oxide film 6 also serves as a lower friction layer which more advantageously suppresses the adhesion of the fine particles.

In addition, the oxide film 6 can be easily formed through oxidation of rubber present in the outer peripheral surface 5, for example, by irradiating the outer peripheral surface 5 with ultraviolet radiation in an oxidizing atmosphere. This suppresses reduction in the productivity of the charging roller 1 and the increase in the production costs of the charging roller 1.

The term "single-layer structure" of the roller body 2 means that the roller body 2 includes a single rubber layer and the oxide film 6 formed by the irradiation with the ultraviolet radiation or the like is not counted.

For production of the charging roller 1, the prepared rubber composition is first extruded into a tubular body by means of an extruder. Then, the tubular body is cut to a predetermined length, and the rubber component of the tubular body is crosslinked in a vulcanization can by pressure and heat.

In turn, the crosslinked tubular body is heated in an oven or the like for secondary crosslinking, and cooled. Then, an outer peripheral surface 5 of the tubular body is polished to a predetermined outer diameter.

Various polishing methods such as a dry traverse polishing method may be used for the polishing. In the present invention, the outer peripheral surface 5 is finished into a finish-polished surface by the wet-polishing method, the mirror-polishing method or the like, as described above, at the final stage of the polishing process.

The shaft 4 may be inserted through and fixed to the through-hole 3 at any time between the end of the cutting of the tubular body and the end of the polishing.

However, it is preferred to carry out the secondary crosslinking and the polishing with the shaft 4 inserted through the through-hole 3 after the cutting. This suppresses the warpage and the deformation of the roller body 2, which may otherwise occur due to the expansion and the contraction of the tubular body during the secondary crosslinking. Further, the roller body 2 may be polished while being rotated about the shaft 4. This improves the working efficiency in the polishing, and suppresses the deflection of the outer peripheral surface 5.

As previously described, the shaft 4 having an outer diameter greater than the inner diameter of the through-hole 3 may be press-inserted into the through-hole 3, or the shaft 4 may be inserted through the through-hole 3 of the tubular body with the intervention of an electrically conductive thermosetting adhesive agent between the shaft 4 and the tubular body before the secondary crosslinking.

In the former case, the electrical connection and the mechanical fixing are achieved simultaneously with the press insertion of the shaft 4.

In the latter case, the thermosetting adhesive agent is cured when the tubular body is heated in the oven for the secondary crosslinking, whereby the shaft 4 is electrically connected to and mechanically fixed to the roller body 2.

As described above, these arrangements may be used in combination to achieve the electrical connection and the mechanical fixing between the shaft 4 and the roller body.

As described above, the formation of the oxide film 6 is preferably achieved by the irradiation of the outer peripheral surface 5 of the roller body 2 with the ultraviolet radiation. That is, the formation of the oxide film 6 is achieved simply through the oxidation of the diene rubber of the rubber composition present in the outer peripheral surface 5 of the roller body 2 by irradiating the outer peripheral surface 5 with ultraviolet radiation having a predetermined wavelength in the oxidizing atmosphere for a predetermined period. Therefore, this method is simple and efficient.

In addition, the oxide film 6 formed by the irradiation with the ultraviolet radiation is free from the problems associated with the conventional coating film formed by applying the coating agent. Further, the oxide film 6 is highly uniform in thickness, and ensures tight adhesion thereof to the roller body 2.

The wavelength of the ultraviolet radiation to be used for the irradiation is preferably not less than 100 nm and not greater than 400 nm, particularly preferably not greater than 300 nm, for efficient oxidation of the diene rubber of the rubber composition for the formation of the oxide film 6 excellent in the aforementioned functions. The irradiation period is preferably not shorter than 30 seconds and not longer than 30 minutes, particularly preferably not shorter than 1 minute and not longer than 20 minutes.

The oxide film 6 may be formed by other methods. In some case, the formation of the oxide film 6 may be obviated.

In the embodiment shown in FIGURE, the roller body is of the single-layer structure formed of the crosslinked product of the specific rubber composition containing the aforementioned ingredients, but may be of a multi-layer structure including two or more layers. In this case, an outermost layer defining the outer peripheral surface may be formed of the crosslinked product of the specific rubber composition containing the aforementioned ingredients, and the outer peripheral surface may be finished into the finish-polished surface.

In either case, the charging roller has a simplified construction without the provision of the coating film, and yet is capable of uniformly electrically charging the surface of the photoreceptor body and more advantageously suppressing the adhesion and accumulation of fine particles.

EXAMPLES

The present invention will hereinafter be described in greater detail by way of inventive examples and comparative examples. However, it should be understood that the present invention be not necessarily limited to these examples.

Example 1

(Preparation of Rubber Composition)

A rubber component was prepared by blending 40 parts by mass of GECO (HYDRIN (registered trade name) T3108 available from Zeon Corporation), 40 parts by mass of IR (Nipol (registered trade name) IR2200 available from Zeon Corporation), 10 parts by mass of NBR (non-oil-extension and lower-acrylonitrile-content type NBR, Nipol DN401LL available from Zeon Corporation and having an acrylonitrile content of 18%) and 10 parts by mass of CR (non-oil-extension type, SHOPRENE (registered trade name) WRT available from Showa Denko K.K.)

While 100 parts by mass of the rubber component including the four types of rubbers was simply kneaded by means of a Banbury mixer, the following ingredients were added to and kneaded with the rubber component.

TABLE 1

| Ingredients | Parts by mass |
| --- | --- |
| Ionic salt | 5 |
| Crosslinking acceleration assisting agent | 5 |
| Acid accepting agent | 3 |
| Filler | 7 |

The ingredients shown in Table 1 are as follows. The amounts (parts by mass) of the respective ingredients shown in Table 1 are based on 100 parts by mass of the overall rubber component.
Ionic salt: Potassium bis(trifluoromethanesulfonyl)imide (EF-N112, K-TFSI available from Mitsubishi Materials Electronic Chemicals Co., Ltd.)
Crosslinking acceleration assisting agent: Zinc oxide Type-2 (available from Sakai Chemical Industry Co., Ltd.)
Acid accepting agent: Hydrotalcites (DHT-4A (registered trade name) 2 available from Kyowa Chemical Industry Co., Ltd.)
Filler: Electrically conductive carbon black (particulate acetylene black, DENKA BLACK (registered trade name) available from Denki Kagaku Kogyo K.K.)

While the resulting mixture was continuously kneaded, the following crosslinking component was further added to and kneaded with the mixture. Thus, a rubber composition was prepared.

TABLE 2

| Ingredients | Parts by mass |
| --- | --- |
| Thiourea crosslinking agent | 0.3 |
| Accelerating agent DT | 0.3 |
| Sulfur crosslinking agent | 1.05 |
| Accelerating agent DM | 0.7 |
| Accelerating agent TS | 0.5 |

The ingredients shown in Table 2 are as follows. The amounts (parts by mass) of the respective ingredients shown in Table 2 are based on 100 parts by mass of the overall rubber component.
Thiourea crosslinking agent: Ethylene thiourea (2-mercaptoimidazoline, ACCEL (registered trade name) 22-S available from Kawaguchi Chemical Industry Co., Ltd.)
Accelerating agent DT: 1,3-di-o-tolylguanidine (guanidine accelerating agent, SANCELER (registered trade name) DT available from Sanshin Chemical Industry Co., Ltd.)
Sulfur crosslinking agent: 5% oil-containing sulfur (available from Tsurumi Chemical Industry Co., Ltd.)
Accelerating agent DM: Di-2-benzothiazolyl disulfide (thiazole accelerating agent, NOCCELER (registered trade name) DM available from Ouchi Shinko Chemical Industrial Co., Ltd.)
Accelerating agent TS: Tetramethylthiuram monosulfide (thiuram accelerating agent, SANCELER TS available from Sanshin Chemical Industry Co., Ltd.)
(Production of Charging Roller)

The rubber composition thus prepared was fed into an extruder, and extruded into a tubular body having an outer diameter of 11.0 mm and an inner diameter of 5.0 mm. Then, the tubular body was fitted around a temporary crosslinking shaft, and crosslinked in a vulcanization can at 160° C. for 1 hour.

Subsequently, the crosslinked tubular body was removed from the temporary shaft, then fitted around a metal shaft having an outer diameter of 6.0 mm and an outer peripheral surface to which an electrically conductive thermosetting adhesive agent (polyamide adhesive agent) was applied, and heated in an oven at 160° C. Thus, the tubular body was bonded to the metal shaft.

After opposite end portions of the tubular body were trimmed, the outer peripheral surface of the resulting tubular body was polished by a traverse polishing method by means of a cylindrical polishing machine, and finished to an outer diameter of 9.50 mm (with a tolerance of 0.05) by a wet polishing method. Thus, a roller body unified with the metal shaft was formed, whereby a charging roller was produced. In the wet polishing method, a #400 wrapping film (MIRROR FILM available from Sankyo Rikagaku Co., Ltd.) was used.

Example 2

A rubber composition was prepared and a charging roller was produced in substantially the same manner as in Example 1, except that 10 parts by mass of SBR (non-oil-extension type, JSR (registered trade name) 1502 available from JSR Co., Ltd., and prepared by an emulsion polymerization method) was blended instead of the NBR.

Example 3

A rubber composition was prepared and a charging roller was produced in substantially the same manner as in Example 1, except that 10 parts by mass of BR (non-oil-extension type, UBEPOL (registered trade name) BR 130B available from Ube Industries, Ltd., and having a cis-1,4 bond content of 96 mass %) was blended instead of the CR.

Example 4

A rubber composition was prepared and a charging roller was produced in substantially the same manner as in Example 1, except that the proportions of the GECO, the IR and the NBR were 35 parts by mass, 20 parts by mass and 45 parts by mass, respectively, and the CR was not blended.

Example 5

A rubber composition was prepared and a charging roller was produced in substantially the same manner as in Example 1, except that the proportions of the NBR and the CR were 1 part by mass and 5 parts by mass, respectively, and 14 parts by mass of the BR (non-oil-extension type, UBEPOL BR 130B available from Ube Industries, Ltd., and having a cis-1,4 bond content of 96 mass %) was further blended.

Example 6

A rubber composition was prepared and a charging roller was produced in substantially the same manner as in Example 1, except that 3 parts by mass of the SBR (non-oil-extension type, JSR 1502 available from JSR Co., Ltd., and prepared by an emulsion polymerization method) was blended instead of the NBR, and the proportion of the CR was 5 parts by mass, and 12 parts by mass of the BR (non-oil-extension type, UBEPOL BR 130B available from Ube Industries, Ltd., and having a cis-1,4 bond content of 96 mass %) was further blended.

Example 7

A rubber composition was prepared and a charging roller was produced in substantially the same manner as in Example 1, except that the proportions of the IR and the NBR were 55 parts by mass and 5 parts by mass, respectively, and the CR was not blended.

Example 8

A rubber composition was prepared and a charging roller was produced in substantially the same manner as in Example 1, except that the proportions of the IR, the NBR and the CR were 30 parts by mass, 25 parts by mass and 5 parts by mass, respectively.

Comparative Example 1

A rubber composition was prepared and a charging roller was produced in substantially the same manner as in Example 1, except that the NBR was not blended, and the proportion of the CR was 5 parts by mass, and 15 parts by mass of the BR (non-oil-extension type, UBEPOL BR 130B available from Ube Industries, Ltd., and having a cis-1,4 bond content of 96 mass %) was further blended.

Comparative Example 2

A rubber composition was prepared and a charging roller was produced in substantially the same manner as in Example 1, except that the NBR was not blended, and the proportion of the CR was 15 parts by mass, and 5 parts by mass of the BR (non-oil-extension type, UBEPOL BR 130B available from Ube Industries, Ltd., and having a cis-1,4 bond content of 96 mass %) was further blended.

Comparative Example 3

A rubber composition was prepared in substantially the same manner as in Example 1, except that the proportions of the GECO, the IR and the NBR were 32 parts by mass, 65 parts by mass and 3 parts by mass, respectively, and the CR was not blended. However, the rubber composition thus prepared was excessively soft and, therefore, it was impossible to form the rubber composition into the predetermined roller body shape. The attempt to produce the charging roller failed.

Comparative Example 4

A rubber composition was prepared and a charging roller was produced in substantially the same manner as in Example 1, except that the proportions of the IR and the NBR were 10 parts by mass and 50 parts by mass, respectively, and the CR was not blended.

Comparative Example 5

A rubber composition was prepared and a charging roller was produced in substantially the same manner as in Example 1, except that the proportions of the GECO, the IR and the NBR were 75 parts by mass, 20 parts by mass and 5 parts by mass, respectively, and the CR was not blended.

Comparative Example 6

A rubber composition was prepared and a charging roller was produced in substantially the same manner as in Example 1, except that the proportions of the GECO and the NBR were 20 parts by mass and 40 parts by mass, respectively, and the CR was not blended.

Comparative Example 7

A charging roller was produced in substantially the same manner as in Example 1, except that the wet polishing was not performed.

<Actual Machine Test>

A new photoconductor unit (available from Lexmark International, Inc.) including a photoreceptor body and a charging roller constantly kept in contact with the surface of the photoreceptor body and attachable to a laser printer main body was prepared, and the charging rollers produced in Examples and Comparative Examples were each incorporated instead of the original charging roller in the photoconductor unit.

After the photoconductor unit thus assembled was mounted in a color laser printer (CS510de available from Lexmark International, Inc.), a 300-lpi black solid image having an image density of 30% was continuously formed on 30000 paper sheets at a rate of 2 sheets per 25 seconds. A charging roller which caused image density unevenness due to nonuniform charging on at least one of images formed on the 30000 paper sheets was rated as unacceptable (x), and a charging roller free from the image density unevenness was rated as acceptable (○).

After the continuous image formation, the charging roller was taken out, and the outer peripheral surface of the charging roller was visually checked. A charging roller having an outer peripheral surface whitened due to adhesion of fine particles was rated as unacceptable (x), and a charging roller having an outer peripheral surface free from the whitening was rated as acceptable (○).

The above results are shown in Tables 3 to 5.

TABLE 3

|     |       | Example 1 | Example 2 | Example 3 | Example 4 | Example 5 |
|-----|-------|-----------|-----------|-----------|-----------|-----------|
|     |       | Parts by mass |       |       |       |       |
| (1) | GECO  | 40  | 40  | 40  | 35  | 40  |
| (2) | IR    | 40  | 40  | 40  | 20  | 40  |
| (3) | SBR   | —   | 10  | —   | —   | —   |
|     | NBR   | 10  | —   | 10  | 45  | 1   |
| (4) | BR    | —   | —   | 10  | —   | 14  |
|     | CR    | 10  | 10  | —   | —   | 5   |
|     | Wet polishing | Done | Done | Done | Done | Done |
|     |       | Evaluation |  |  |  |  |

TABLE 3-continued

|  | Example 1 | Example 2 | Example 3 | Example 4 | Example 5 |
|---|---|---|---|---|---|
| Whitening | ○ | ○ | ○ | ○ | ○ |
| Density unevenness | ○ | ○ | ○ | ○ | ○ |

TABLE 4

|  |  | Example 6 | Example 7 | Example 8 | Comparative Example 1 | Comparative Example 2 |
|---|---|---|---|---|---|---|
| Parts by mass |
| (1) | GECO | 40 | 40 | 40 | 40 | 40 |
| (2) | IR | 40 | 55 | 30 | 40 | 40 |
| (3) | SBR | 3 | — | — | — | — |
|  | NBR | — | 5 | 25 | — | — |
| (4) | BR | 12 | — | — | 15 | 5 |
|  | CR | 5 | — | 5 | 5 | 15 |
|  | Wet polishing | Done | Done | Done | Done | Done |
| Evaluation |
| Whitening | | ○ | ○ | ○ | ○ | ○ |
| Density unevenness | | ○ | ○ | ○ | x | x |

TABLE 5

|  |  | Comparative Example 3 | Comparative Example 4 | Comparative Example 5 | Comparative Example 6 | Comparative Example 7 |
|---|---|---|---|---|---|---|
| Parts by mass |
| (1) | GECO | 32 | 40 | 75 | 20 | 40 |
| (2) | IR | 65 | 10 | 20 | 40 | 40 |
| (3) | SBR | — | — | — | — | — |
|  | NBR | 3 | 50 | 5 | 40 | 10 |
| (4) | BR | — | — | — | — | — |
|  | CR | — | — | — | — | 10 |
|  | Wet polishing | Done | Done | Done | Done | Undone |
| Evaluation |
| Whitening | | — | x | ○ | ○ | x |
| Density unevenness | | — | x | x | x | x |

The results for Examples 1 to 8 and Comparative Examples 1, 2 and 7 shown in Tables 3 to 5 indicate that, where the GECO, the IR and the SBR and/or the NBR are used in combination for the rubber component and the outer peripheral surface of the roller body is finished into the finish-polished surface, the charging roller has a simplified construction without the provision of the coating film, and yet is capable of uniformly electrically charging the surface of the photoreceptor body and more advantageously suppressing the adhesion of fine particles.

The results for Examples 1 to 8 and Comparative Examples 3 to 6 indicate that, in order to provide the aforementioned effects, the rubber component should include not less than 30 parts by mass and not greater than 70 parts by mass of the GECO, not less than 15 parts by mass and not greater than 60 parts by mass of the IR and not less than 1 part by mass of the SBR and/or the NBR based on 100 parts by mass of the overall rubber component.

The results for Examples 1 to 8 indicate that, for further improvement of the aforementioned effects, the proportion of the GECO is preferably not less than 35 parts by mass and not greater than 50 parts by mass, particularly preferably not greater than 40 parts by mass, and the proportion of the IR is preferably not less than 20 parts by mass and not greater than 55 parts by mass, and the proportion of the SBR and/or the NBR is preferably not greater than 45 parts by mass based on 100 parts by mass of the overall rubber component.

This application corresponds to Japanese Patent Application No. 2017-129428 filed in the Japan Patent Office on Jun. 30, 2017, the disclosure of which is incorporated herein by reference in its entirety.

What is claimed is:

1. A charging roller comprising a roller body having an outer peripheral surface finished in a finish-polished surface,
    wherein the roller body has a surface portion including the finish-polished surface, and at least the surface portion comprises a crosslinked product of a rubber composition containing a rubber component,
    wherein the rubber component comprises, based on 100 parts by mass of the overall rubber component:
    (1) not less than 30 parts by mass and not greater than 70 parts by mass of epichlorohydrin-ethylene oxide-allyl glycidyl ether terpolymer rubber;
    (2) not less than 15 parts by mass and not greater than 60 parts by mass of isoprene rubber, wherein the isoprene rubber is a homopolymer; and
    (3) not less than 1 part by mass of at least one selected from the group consisting of styrene butadiene rubber and acrylonitrile butadiene rubber.

2. The charging roller according to claim 1, wherein the rubber component further comprises:
    (4) at least one selected from the group consisting of butadiene rubber and chloroprene rubber.

3. The charging roller according to claim 2, further comprising an oxide film provided in the outer peripheral surface.

4. The charging roller according to claim 1, further comprising an oxide film provided in the outer peripheral surface.

5. A charging roller production method for producing a charging roller comprising a roller body, the method comprising the steps of:
    forming at least a surface portion of the roller body from a crosslinked product of a rubber composition containing a rubber component; and
    wet-polishing or mirror-polishing an outer peripheral surface of the roller body into a finish-polished surface;
    wherein the rubber component comprises, based on 100 parts by mass of the overall rubber component:
    (1) not less than 30 parts by mass and not greater than 70 parts by mass of epichlorohydrin-ethylene oxide-allyl glycidyl ether terpolymer rubber;
    (2) not less than 15 parts by mass and not greater than 60 parts by mass of isoprene rubber, wherein the isoprene rubber is a homopolymer; and
    (3) not less than 1 part by mass of at least one selected from the group consisting of styrene butadiene rubber and acrylonitrile butadiene rubber.

6. The charging roller production method according to claim 5, wherein the rubber component further comprises:
    (4) at least one selected from the group consisting of butadiene rubber and chloroprene rubber.

7. The charging roller production method according to claim 5, further comprising the step of forming an oxide film in the outer peripheral surface by irradiating the outer peripheral surface with ultraviolet radiation.

\* \* \* \* \*